May 2, 1950
L. J. MELLERT
2,505,783
LIGHTPROOF REWIND DEVICE
Filed Nov. 27, 1946
2 Sheets-Sheet 1
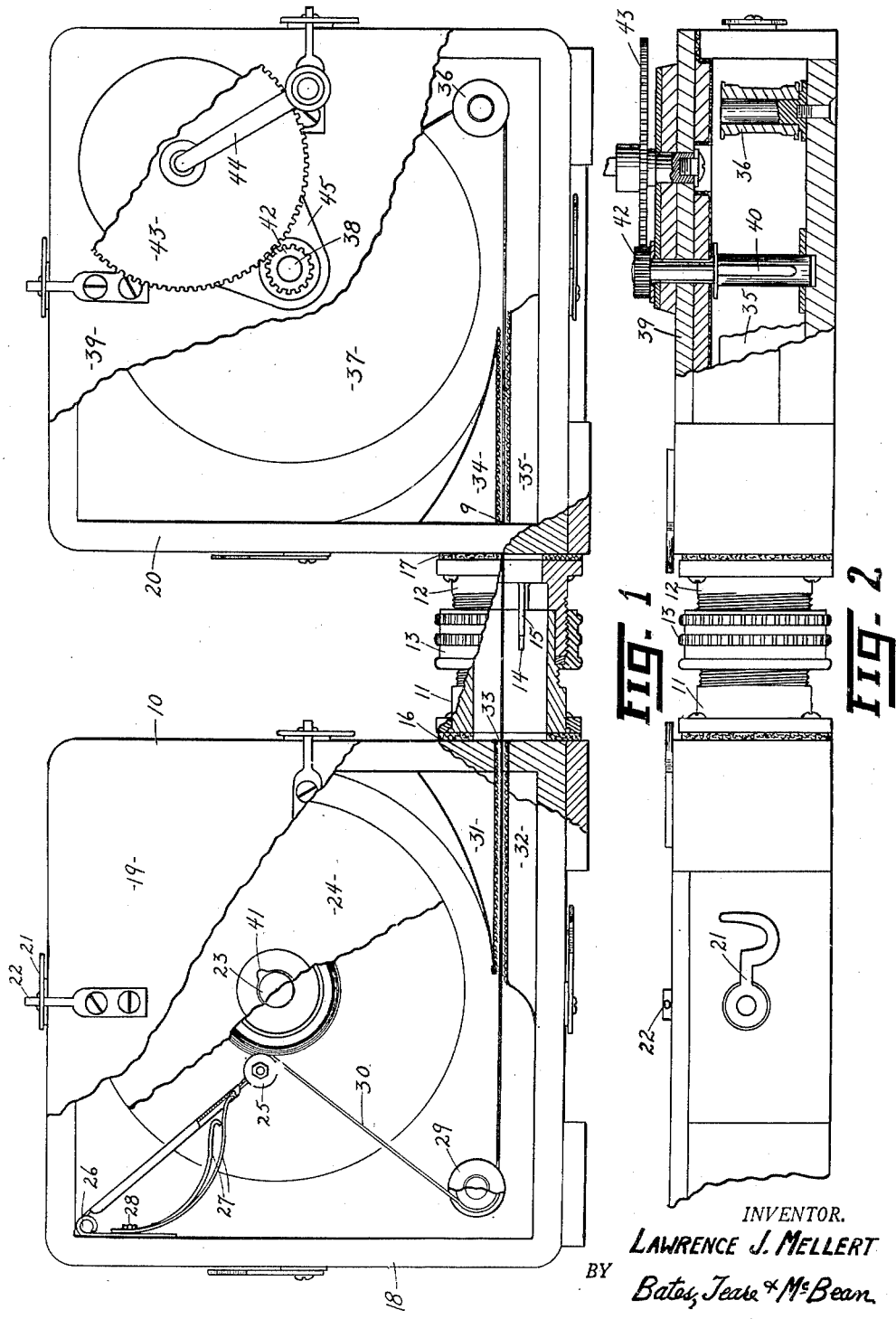
INVENTOR.
LAWRENCE J. MELLERT
BY Bates, Teare & McBean
ATTORNEYS May 2, 1950     L. J. MELLERT     2,505,783
LIGHTPROOF REWIND DEVICE Filed Nov. 27, 1946     2 Sheets-Sheet 2

INVENTOR.
LAWRENCE J. MELLERT
BY Bates, Teare & McBean
ATTORNEYS

Patented May 2, 1950

2,505,783

UNITED STATES PATENT OFFICE 2,505,783

LIGHTPROOF REWIND DEVICE

Lawrence J. Mellert, Atlanta, Ga.

Application November 27, 1946, Serial No. 712,530

8 Claims. (Cl. 242—55)

This invention relates to means, or apparatus for handling and rewinding unexposed or live film and/or exposed film in strip form. Such device is intended for reeling strip film adapted for use in the ordinary camera, where either relatively long length and/or shorter lengths are desired.

An object of the invention is to provide an apparatus in which strip film may be transferred from one cartridge to another, or from one magazine to another in full daylight without resorting to the use of a dark room or a space conditioned with non-actinic light.

Another object of this invention is to render the loading and unloading of cartridges or magazines with strip film in an efficient and economical manner.

A further object of the invention is to provide a means whereby blank leader film may be spliced to one end of the film, and whereby such blank leader film can be spliced to the two visible ends of the film at any desired place upon the transferring of the film from one magazine to the other.

A further object of this invention is to provide a reservoir of extra film from which smaller spools can be filled without necessitating the use of such apparatus in the dark.

With these and further objects in view, as may become apparent from the following disclosure, it will be seen that the handling, transferring and rewinding of film from one magazine to the other, is accomplished with less film wastage, less eye strain, the avoidance of working in the dark, and with an appreciable saving of time.

Figure 3:
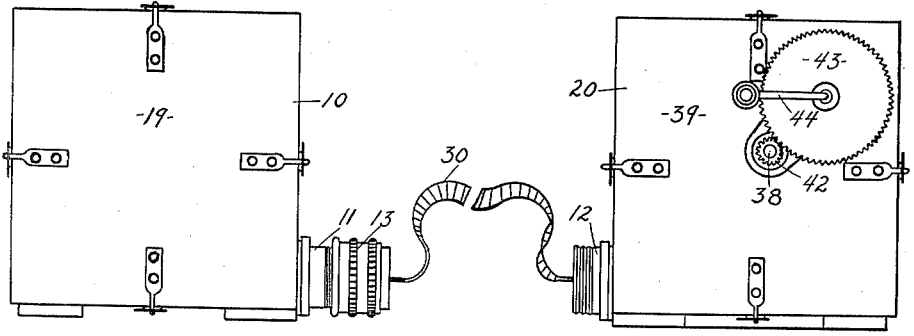
Figure 5:
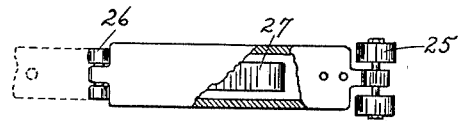
Figure 4:
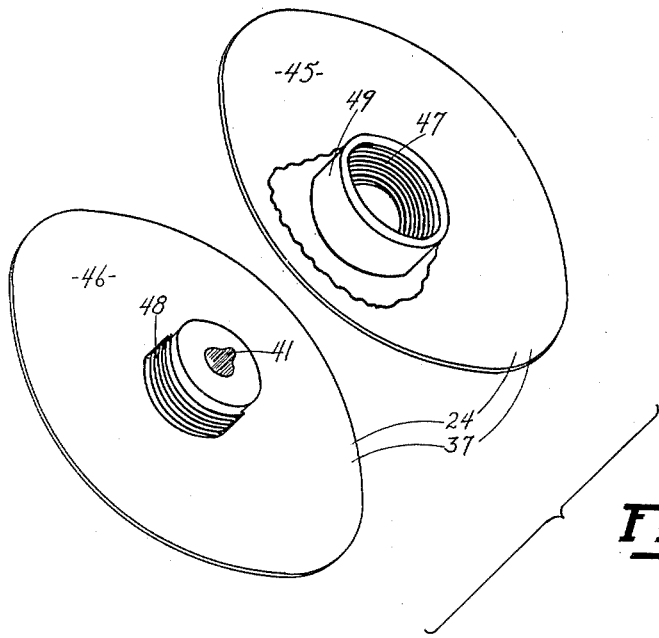

Fig. 1 is a side elevation view of the apparatus partly broken away illustrating the two magazines in operative position; Fig. 2 is a bottom view of the device partly broken away; Fig. 3 is a side elevation of the device in open position, the two magazines being separated to permit the splicing of the film strip; Fig. 4 is a perspective view of the spool as used in my apparatus, the two parts of the spool being separated, and Fig. 5 is a partial horizontal view of the tension spring and roller traveler which ride the film for retarding one of the spools.

Referring to the drawings, Fig. 1 shows a pair of housings 10 and 20 connected together by a hollow channel member comprising a male section 11 and a female section 12, and an annular threaded collar 13 which interlocks the sections 11 and 12. The section 11 has a horizontal slot opening 14 to admit a key 15 carried by the section 12, which secures the two sections in proper alignment. The interior of the sections 11 and 12 may, if desired, be lined with felt to provide a light-tight joint with the collar 13 securely threaded to the section 12. Suitable felt gaskets 16 and 17 are interposed between the exterior of the housing 10 and 20, respectively to form a light-tight joint with the sections 11 and 12 respectively.

The housing 10 comprises a box-like portion 18, a separate cover 19 securely attached thereto by conventional fasteners, one for each of the four sides of said housing, shown in the drawings as a hook and peg arrangement 21 and 22, respectively. The interior of the cover 19 is lined with a felt-like material to obtain the desirable light-tight connection.

Positioned centrally in the housing 10 is a spindle 23 on which a spool 24 is independently mounted for rotation with a loose sliding connection thereon. Strip film 30 is reeled upon the spool as will hereinafter be described in detail.

A tension spring roller traveler 25 is mounted upon one of the side walls of the section 18 by a suitable bracket and pin structure 26 and a pair of springs 27 attached to the bracket at 28. Such springs 27 bear on the undersurface of the arm upon which the roller traveler is positioned. The springs are of the leaf spring type and are under tension at all times. They operate to force the roller traveler against the film which is reeled upon the spool, so that the traveler retards the unreeling, thereby preventing the film from buckling, running off, or jamming. A guide roller 29 is positioned within the housing to facilitate movement of the film from the spool through light trap guideways, comprising members 31 and 32 which in turn may be felt-lined to prevent the pick-up of static normally acting on the emulsion of live film if reeled too fast. The film 30 is then passed through a light trap in the housing, as shown by 33, into the female section 11.

The housing 20 is constructed similarly to the housing 10 and has a light trap 9 similar to and in alignment with the light trap 33 of the housing 10. The light trap 9 includes guideways 34 and 35 similar to those indicated at 31 and 32 respectively. A guide roller 36 directs the film strip onto a spool 37, which is mounted on a spindle 38 that depends from a cover 39 for the housing 20. The spindle 38 may carry a key 40, best shown in Fig. 2, which fits into an opening 41 in the spool for driving connection thereto. The spindle 38 may be actuated by a pinion 42 which meshes with a gear 43 that is disposed on the exterior of the cover 39 and is actuated by a handle 44. In operation, film which is placed on the spool 24 in the housing 10 is passed around the guide roller 29 and through the guideways 31 and 32 into the hollow channel member and then into the housing 20 through the guideways 34 and 35, around the guide roller 36 and onto the spool 37. This operation may be accomplished readily within a dark room. Thereupon the covers 19 and 39 are locked to the housings 10 and 20 respectively and the collar 13 is tightened to connect the two housings. Upon actuation of the handle 44 clockwise, the film may be transferred from the housing 10 to the housing 20. Any desired amount of film may be thus wound from one spool to the other, and experience with the device in a short time will enable the operator to judge the number of turns required for a definite length of film.

The device may be used when fully loaded without the use of a dark room and when blank leader film is properly attached to the exposed film before the loading of the housing 10, the operation may be conducted in full daylight without the usual exposure of the film. Should the operator wish to splice the film at any predetermined length, or attach and splice blank leader film between sections of the film being transferred, the collar 13 may be unscrewed, the two housings separated but a few inches as shown in Fig. 3, and the film may be cut, spliced or a section may be removed, dependent upon the operation conducted. Then the collar 13 may be threaded onto the member 12 and the two housings may be connected for further transferring or reeling more film into the housing 20. During the latter operation, only a few inches of film will be lost due to the exposure thereof to daylight, whereas in previous devices the film wastage would amount to several feet.

A further desirable feature of the device is that small cameras may be loaded with a short length of film, such as 25 feet, in which case the housing 10 may be used as a magazine of extra film, and the housing 20 may be used for the insertion of smaller spools upon which a shorter length of film is desired.

Referring to Fig. 4, each spool 24 and 37 is shown in two distinct but separate sections 45 and 46. The two sections may be connected together by hubs 47 and 48 which are provided with left hand threads 47 and 48. A roll of bulk film can be placed over the hub 47 and then the sections may be threaded together as previously described. To permit additional ease and speed in loading the housing 10 the section 45 may be placed within the housing, and the bulk film may be dropped into place on the spool hub 49 as the operator forces the arm of the roller traveler 25 away from the centermost portion of the housing 10. The roller traveler is then allowed to abut the film 30 through the action of the springs 27, and the section 46 may then be screwed into the section 45 prior to the threading of the film through the housing 10.

An advantage of the present invention is the fact that the apparatus can be manufactured economically from a variety of materials, and that it can be readily used in daylight for splicing film with the loss of only a few inches of film.

I claim:

1. A device for handling strip film comprising in combination, a pair of housing sections, each being adapted to hold a film carrying reel, means in one of the sections for imparting a drag on the rotation of the reel therein, and means carried by the other section for rotating the reel therein to draw film from one section into the other, and a conduit for the film extending between the sections, said conduit comprising a detachable coupling in the form of a screw and nut coupling.

2. In a device for handling strip film, the combination of a pair of housing sections, each having means carried thereby for holding a reel and each having a substantially light-tight opening in its edge portion adapted to receive and guide film to and from said reels, one of the housing sections having a handle member carried thereby for rotating said reel from the exterior of said housing, and a light-proof tunnel connecting said housings, the tunnel being in communication with the light-tight openings in the respective housings, the tunnel comprising a pair of aligned sections and a threaded sleeve for coupling said sections together.

3. An apparatus of the character described comprising a pair of substantially light-tight housings having a hollow member forming an interlocking connection therebetween, said member having a light-tight passage therethrough and consisting of a male section and a female section, and a threaded sleeve forming a releasable connection therebetween, each of the housings carrying a detachably mounted reel therein, and means for reeling film from one housing to the other.

4. A device for handling strip film comprising in combination, a pair of hollow housing sections, each having a removable cover for one side thereof, one of the sections comprising a film magazine having a reel removably positioned therein, the other section having a reel receiving shaft carried by its cover and having a handle carried on the exterior portion thereof for operating said shaft, each of said housing sections having an opening therein through which film may enter or leave the section, and having a light trap adjacent the opening, and a hollow screw and nut coupling providing a light-tight passageway between said housing sections.

5. A device for handling strip film comprising in combination a pair of housing sections, each comprising a hollow member having a removable cover therefor, means for locking the covers to the respective sections, a reel journaled for rotation in each section, means on one of the covers for rotating the reel in the corresponding section, a spring actuated follower for imparting a drag to the reel in the other housing section, each housing section having an opening therein through which film may be passed, and each having a light trap adjacent to the opening therein, and a tunnel providing a passageway for film from one housing section to the other, said tunnel comprising parts connected detachably independent of said light traps where the portion of the film between the housings may be exposed for cutting or splicing purposes.

6. A substantially light-tight film rewind mechanism comprising a pair of housings each having a light trap associated with a film passageway, said housing being adapted to be releasably held together by a hollow member, said member surrounding the mouths of said passageways and forming an interlocking connection between said housings and consisting of a male section and a female section, each being attached to one of said housings, releasable means for locking the two sections together, a releasably mounted reel carried within each of said housings, and means for driving one of the reels within a housing to transfer film from one housing to the other.

7. An apparatus of the character described comprising a pair of substantially light tight film housings, each having means for carrying a reel therein, each housing having an opening for the passage of the film and having a light trap associated with such opening, and a tunnel normally connecting the two housings and surrounding the space between two openings but detachable without disturbing the light traps of the two housings.

8. An apparatus comprising a pair of housings each having means for carrying a reel therein, each housing having an opening for the passage of the film, and a tunnel normally connecting the two housings and surrounding the space between two openings, said tunnel being cylindrical in form and composed of two members one overlapping the other, and means for removably connecting said overlapping members to each other but allowing their detachment and separation from each other.

LAWRENCE J. MELLERT.

REFERENCES CITED

The following references are of record in the file of this patent:

UNITED STATES PATENTS

| Number | Name | Date |
| --- | --- | --- |
| 1,707,767 | Ponting et al. | Apr. 2, 1929 |
| 2,188,377 | Small | Jan. 30, 1940 |
| 2,205,052 | Stein | June 18, 1940 |
| 2,239,188 | Boes | Apr. 22, 1941 |
| 2,341,402 | Whittaker | Feb. 8, 1944 |